Feb. 16, 1926.
M. J. ECONOMIDES
HINGE
Filed June 19, 1924
1,573,231
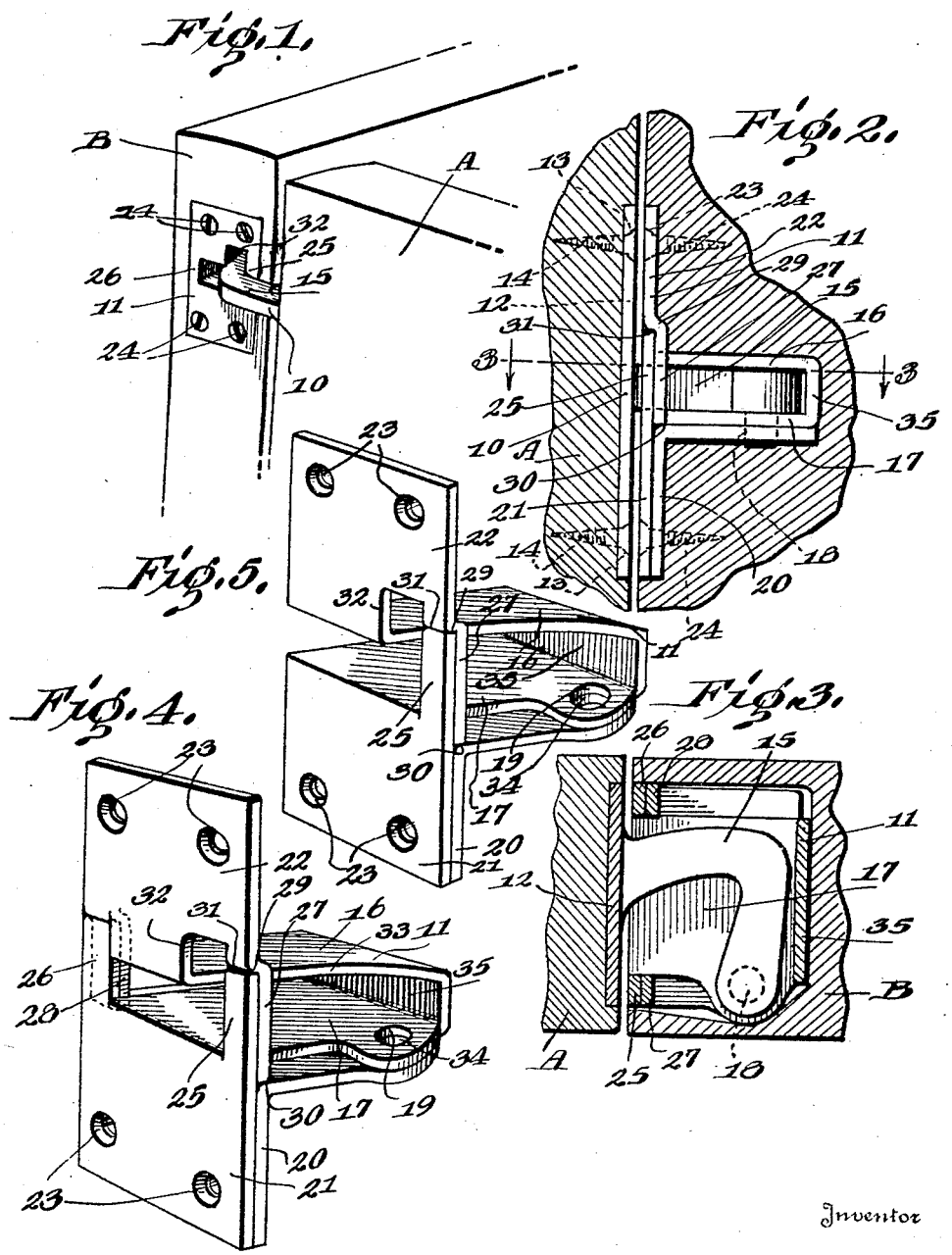
Inventor
Michael J. Economides Patented Feb. 16, 1926.

1,573,231

UNITED STATES PATENT OFFICE.

MICHAEL J. ECONOMIDES, OF BROOKLYN, NEW YORK.

HINGE.

Application filed June 19, 1924. Serial No. 721,010.

*To all whom it may concern:*

Be it known that I, MICHAEL J. ECONOMIDES, a citizen of the United States, residing at Brooklyn, in the county of Kings and State of New York, have invented certain new and useful Improvements in a Hinge, of which the following is a specification.

The present invention relates to a hinge for automobile doors, and aims to provide a novel and improved device of that kind for conveniently permitting the assembly or removal of a door from an automobile body without the necessity of inserting or removing screws.

Another object is the provision of a novel separable hinge having a U-shaped section carried by the door post of an automobile for receiving therebetween a pintle section carried by the door of the automobile, said U-shaped section having straight parallel plates attached together at the bight portion thereof and at the outer ends to provide a substantial and practical structure for firmly supporting the door to prevent sagging thereof, yet permitting the easy swinging of the door and the ready removal thereof from the body frame.

It is also an object of the invention to provide a hinge of the kind indicated, which is simple and substantial in construction, which can be manufactured economically, and which will be thoroughly efficient and practical in use.

With the foregoing and other objects in view, which will be apparent as the description proceeds, the invention resides in the construction and arrangement of parts, as hereinafter described and claimed, it being understood that changes can be made within the scope of what is claimed, without departing from the spirit of the invention.

The invention is illustrated in the accompanying drawings, wherein:

Figure 1 is a perspective view showing my improved device applied to the door and frame of an automobile, Figure 2 is a side elevation of my improved device, Figure 3 is a horizontal section on the line 3—3 of Figure 2, Figure 4 is a perspective view of the U-shaped section of the device, and Figure 5 is a perspective view similar to Figure 4 showing a slightly modified form.

In carrying out my invention there is provided a pintle section 10 carried by the door A and a U-shaped section 11 secured to the door post B of the body frame. The section 10 has a plate 12 therein provided with countersunk apertures 13 through which screws 14 are adapted to extend for securing the section 10 to the door A. The plate 12 has an L-shaped hook arm 15 formed centrally thereon extending at substantially right angles therefrom adapted to be received between the straight parallel side portions 16 and 17 of the U-shaped section 11. At the free end of the arm 15 a depending pin 18 is provided for reception in an aperture 19 formed in the lower portion 17.

The U-shaped section 11 is stamped from a single piece of sheet material, with the exception of the angular supporting member 20, which is welded or otherwise secured to the lower surface of the lower portion 17 and the inner face of the flange 21 bent from said lower plate. The upper plate 16 also has a flange bent at right angles therefrom in the opposite direction to the flange 21 as indicated by the numeral 22. Said flanges 21 and 22 have countersunk openings 23 therein to permit screws 24 to be passed through the flanges for attaching the U-shaped section to the door post of the frame B of the automobile.

The two flanges 21 and 22 lie on the same plane extending in opposite directions, the lower flange 21 having extensions 25 and 26 thereon projecting towards the flange 22, while the flange 22 has extensions 27 and 28 projecting towards the flange 21. The extensions 27 and 28 are slightly offset as at 29 to permit the extensions 25 and 26 to lie flush with the flange 22. The extensions 25 and 27 and the extensions 26 and 28 respectively are welded together to rigidly hold the parallel portions 16 and 17 against movement with relation to each other.

It is to be noted that the ends of the extensions 27 and 28 engage the top portion of the angular member 20 as indicated by the numeral 30, while the ends of the extensions 25 and 26 engage the offset portions 29 of the extensions 27 and 28 as indicated by the numeral 31, to prevent inward movement of the portions 17 and 16, and that the cutting of the extensions 25 and 26 from the plate 17 permit such engagement of the extensions 27 and 28 with the angular member 20.

The flange 22 and the upper plate 16 have a slot 32 and a cutaway portion 33 respectively to permit the raising of the hook shaped arm 15 when the door A is open to disengage the pin 18 from the aperture 19 for removing the door from the body frame. The angular member 20 has an aperture 34 therein aligning with the aperture 19 to form a large and substantial bearing for the pin 18.

It can be seen that the U-shaped section 11 can be made of rather light material and yet provide a substantial and practical structure, as the bight or joining portion 35 from which the parallel portions 16 and 17 are bent form a support for the plates along one side and at two corners thereof, and the extensions 25, 26, 27, and 28 form rigid supporting means at the other two corners of the plates, thus preventing any movement of one plate with relation to the other, while the angular member 20 supports the plates against movement with relation to the lower flange 22.

In operation when the door of the automobile is opened or closed, the arm 15 is moved between the portions 16 and 17 as the pin 18 turns in the aligning apertures 19 and 34, and when it is desired to remove the door the same is opened to move the arm 15 below the slot 32 and cutaway portion 33 so that the arm 15 may move upwardly when the door is raised to disengage the depending pin 18 from the aligning openings 19 and 34. Then by movement of the door away from the frame, the two sections 10 and 11 of my improved hinge will be separated.

Figure 5 of the drawings illustrates a modified form of the U-shaped section of my device, showing but one point of connection at the free ends of the parallel portions 16 and 17, the extensions 26 and 28 being omitted and only the extensions 25 and 27 used to hold said plate in spaced parallel relation.

Having thus described the invention, what is claimed as new is:

A hinge structure comprising a plate having alined end portions and angularly disposed intermediate, spaced, parallel portions, said parallel portions being connected with each other at one end by the intermediate portion of the plate and the end portions of the plate at the other end of the parallel portions being provided with extensions which overlap each other and bridge the space between the parallel portions of the plate and a hinge arm pivotally mounted between the parallel portions of the plate.

In testimony whereof, I have affixed by signature.

MICHAEL J. ECONOMIDES.